Sept. 10, 1940.　　　　　S. BAXENDALE　　　　　2,214,241
COLLET

Filed Oct. 24, 1938

*INVENTOR*
SAMUEL BAXENDALE
*BY*
Whittemore Hulbert & Belknap
*ATTORNEYS*

Patented Sept. 10, 1940

2,214,241

UNITED STATES PATENT OFFICE 2,214,241

COLLET

Samuel Baxendale, Dearborn, Mich.

Application October 24, 1938, Serial No. 236,794

3 Claims. (Cl. 279—46)

The invention relates to collets and more particularly that type intended for heavy duty. It is customary to provide such collets with a serrated or roughened inner surface which increases the gripping effect upon the engaged member, such as a stock bar or tool shank. However, these serrations are usually formed in such a manner that the projecting points are in axial and circumferential alignment with each other. Also, intermediate the projecting points are grooves which extend parallel to the axis and circumferentially in planes perpendicular thereto. In the actual performance of work the stresses which are transmitted between the gripped member and collet are neither purely axial or circumferential, but rather are in a direction which is the resultant of these two forces, being in a direction oblique to each.

Another defect in this form of gripping surface is that the pressure of the projecting points displaces metal in the grooves which is thereby weakened. Consequently, there is danger that this metal may be sheared, thereby opening a channel through which the gripping points can freely move.

It is the object of the present invention to obtain a construction of collet having a more effective gripping surface, and to this end the invention consists in the construction as hereinafter set forth.

Figure 1:
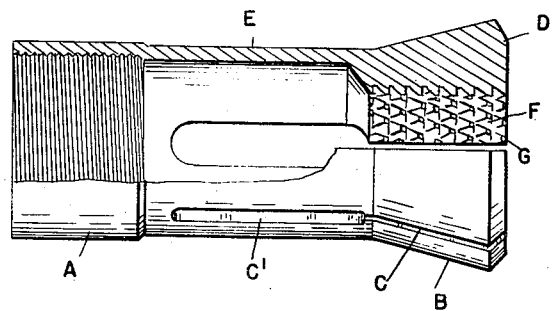
Figure 1 is a side elevation of a collet partly broken away to show a portion of the gripping surface.
Figure 2:
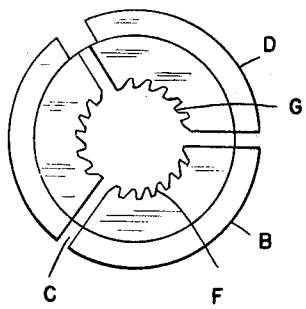
Figure 2 is an end elevation thereof.
Figure 3:
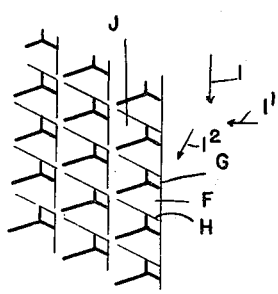
Figure 3 is an enlarged view showing a development of a portion of the gripping surface and indicating the direction of forces applied thereto.

The collet may be of any suitable construction, but as illustrated A is the hollow cylindrical body having the flaring end portion B for engagement with the surrounding conical bearing, not shown. C are slots extending longitudinally through the portion B and having the portion C' enlarged in width in the body member A. This divides the collet into a series of spring jaws D, which are moved radially inward during the gripping operation, and to impart greater flexibility the bore of the body portion is increased in diameter to form comparatively thin walls E.

To form my improved gripping surface the longitudinal grooves F between the projecting teeth G extend in a direction oblique to the axis. This will form said teeth with corresponding obliquely extending surfaces H which are substantially perpendicular to the force which is a resultant of axial and torque thrusts, as indicated by the arrows I, I' and I². There are also circumferential grooves B between successive rows of teeth, but it will be noted that the teeth in successive rows are in staggered relation with respect to the direction of resultant force, thereby avoiding danger of shearing the metal therebetween.

My improved construction is one which can be easily manufactured by the usual circumferential grooving, together with a spiral broaching operation. The teeth are also preferably formed so that their faces which are opposed to the thrust are substantially perpendicular thereto in a radial direction, or in other words are of a saw-toothed character.

What I claim as my invention is:

1. A collet provided with an inner gripping face formed by successive grooves in planes perpendicular to the axis of rotation and successive intersecting spiral grooves, one face of each of said grooves extending substantially radially to form thrust receiving shoulders and the other face being obliquely inclined to said first face.

2. A collet provided with an inner gripping face formed by successive circumferentially extending grooves and successive intersecting spiral grooves, one face of each of said grooves extending substantially radially to form thrust engaging shoulders and the other face being obliquely inclined to said first face, the width of said groove in the inner gripping face being greatly in excess of the areas of the portions therebetween, thereby forming in the work when said gripping face is embedded therein strong backing reenforcements adjacent to each radially extending thrust receiving shoulder.

3. A collet provided with an inner gripping face formed by successive grooves in planes perpendicular to the axis of rotation and successive intersecting spiral grooves, one face of each of said grooves extending substantially radially to form thrust receiving shoulders and the other face being obliquely inclined to said first face, the width of said grooves in the inner gripping face being greatly in excess of the area of the portions therebetween, thereby forming in the work when said gripping face is embedded therein a strong backing reenforcement adjacent to each radially extending thrust receiving shoulder.

SAMUEL BAXENDALE.